(12) United States Patent
Song et al.

(10) Patent No.: US 8,654,269 B2
(45) Date of Patent: Feb. 18, 2014

(54) LIQUID CRYSTAL DISPLAY DEVICE

(75) Inventors: Hong Sung Song, Kumi-Shi (KR); Sai Chang Yun, Daegu-kwangyeokshi (KR); Sang Chang Yun, Kyoungsangbuk-do (KR); Jae Woo Lee, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/540,229

(22) Filed: Jul. 2, 2012

(65) Prior Publication Data

US 2012/0268679 A1    Oct. 25, 2012

Related U.S. Application Data

(62) Division of application No. 12/591,308, filed on Nov. 16, 2009, now Pat. No. 8,212,952, which is a division of application No. 11/979,367, filed on Nov. 1, 2007, now Pat. No. 7,633,569, which is a division of application No. 10/874,166, filed on Jun. 24, 2004, now Pat. No. 7,304,691.

(30) Foreign Application Priority Data

Jun. 24, 2003  (KR) .................. 10-2003-0041122

(51) Int. Cl.
*G02F 1/1333*  (2006.01)
*G02F 1/1343*  (2006.01)

(52) U.S. Cl.
USPC .............. 349/39; 349/38; 349/110; 349/111; 349/113; 349/139; 257/48; 257/88

(58) Field of Classification Search
USPC ........... 349/38, 39, 110, 111, 113; 257/48, 88
See application file for complete search history.

(56) References Cited

U.S. PATENT DOCUMENTS

| 5,767,926 | A | 6/1998 | Kim et al. |
|---|---|---|---|
| 6,545,736 | B2 | 4/2003 | Ashizawa et al. |
| 6,610,997 | B2 | 8/2003 | Murade |
| 6,690,434 | B1 | 2/2004 | Yamazaki et al. |
| 6,831,295 | B2 | 12/2004 | Tsubo |
| 6,900,861 | B2 * | 5/2005 | Yasui ............................ 349/110 |
| 6,972,812 | B2 * | 12/2005 | Lu et al. ......................... 349/43 |
| 6,980,273 | B2 | 12/2005 | Ota et al. |

(Continued)

FOREIGN PATENT DOCUMENTS

| JP | 2003172919 A | * 6/2003 | ............ G02F 1/1335 |
|---|---|---|---|
| KR | 10-1996-0016796 | 12/1996 | |

(Continued)

*Primary Examiner* — Huyen Ngo
(74) *Attorney, Agent, or Firm* — McKenna Long & Aldridge, LLP

(57) ABSTRACT

A liquid crystal display panel capable of reducing a capacitance of a parasitic capacitor between a data line and a pixel electrode. The liquid crystal display panel comprises: a thin film transistor at a crossing of a gate line and a data line, liquid crystal cells including a pixel electrode connected to the thin film transistor; first shield patterns in the liquid crystal cells, each shield pattern being parallel to the data line without overlapping the data line, wherein the shield patterns are insulated from and overlap with an outer portion of the pixel electrode; and a common line arrayed to connect the shield patterns for each the liquid crystal cell.

10 Claims, 41 Drawing Sheets

(56) References Cited

U.S. PATENT DOCUMENTS

| | | |
|---|---|---|
| 7,012,656 B2 * | 3/2006 | Murade .................... 349/43 |
| 7,554,630 B2 | 6/2009 | Kwon et al. |
| 2003/0112393 A1 | 6/2003 | Watanabe et al. |
| 2004/0135939 A1 | 7/2004 | Luo |
| 2011/0051027 A1 * | 3/2011 | Shin et al. .................... 349/42 |
| 2011/0273648 A1 * | 11/2011 | Lee et al. .................... 349/106 |

FOREIGN PATENT DOCUMENTS

| | | |
|---|---|---|
| KR | 10-1999-0001493 | 1/1999 |
| KR | 10-2003-0016017 | 2/2003 |
| KR | 10-2003-0031443 | 4/2003 |

* cited by examiner

LIQUID CRYSTAL DISPLAY DEVICE

CROSS-REFERENCE TO RELATED APPLICATIONS

This application is a divisional of U.S. patent application Ser. No. 12/591,308, filed Nov. 16, 2009, U.S. Pat. No. 8,212,952 now allowed, which is a divisional of U.S. patent Ser. No. 11/979,367, filed Nov. 1, 2007 now U.S. Pat. No. 7,633,569, which is a divisional application of Ser. No. 10/874,166, filed Jun. 24, 2004 now U.S. Pat. No. 7,304,691, which claims priority to Korean Patent Application No. 10-2003-41122, filed Jun. 24, 2003, each of which are incorporated by reference for all purposes as if fully set forth herein.

BACKGROUND OF THE INVENTION

1. Field of the Invention

The present invention relates to a liquid crystal display device. More particularly, the present invention relates to a liquid crystal display panel capable of minimizing crosstalk by using a parasitic capacitor between a pixel electrode and a data line.

2. Discussion of the Related Art

Generally, a liquid crystal display (LCD) controls the light transmittance of liquid crystal with dielectric anisotropy by using an electric field to display a picture. To this end, the LCD includes a liquid crystal display panel having liquid crystal cells arranged in a matrix, and a drive circuit for driving the liquid crystal display panel.

The drive circuit for the liquid crystal display drives the liquid crystal display panel in an inversion driving method to improve display quality as well to prevent the liquid crystal from deteriorating. The inversion driving method includes a frame inversion system, a line (or column) inversion system, and a dot inversion system.

In the dot inversion driving method, the polarities of the liquid crystal cells are opposite to those of an adjacent liquid crystal cells in a horizontal and a vertical direction, and are inverted for each frame. The dot inversion driving method may provide a picture with a better quality than other inversion methods because flickers that may occur in the horizontal and vertical direction offset each other.

However, the dot inversion driving method has a disadvantage because the polarity of the pixel voltage signal applied from the data driver to the data line is inverted in the horizontal and vertical direction, an amount of the fluctuation of a pixel signal, i.e., the frequency of a pixel signal, is higher than that of the other inversion methods, thus power consumption is high.

To solve the problem of the high power consumption in the dot inversion method, a liquid crystal display which is adaptive to drive the liquid crystal cells in the dot inversion system while driving data lines in a column inversion system as shown in FIG. 1 have been proposed.

Referring to FIG. 1, the liquid crystal display includes a liquid crystal display panel 12 having a liquid crystal cell matrix, a gate driver 14 driving gate lines GL1 to GLn of the liquid crystal display panel 12, a data driver 16 driving data lines DL1 to DLm+1 of the liquid crystal display panel 12, and a timing controller 18 controlling the gate driver 14 and the data driver 16.

The liquid crystal display panel 12 includes liquid crystal cells, each having a thin film transistor TFT formed at each crossing of the gate lines GL1 to GLn and the data lines DL1 to DLm+1, and a pixel electrode PXL. The thin film transistor TFT applies a pixel signal from the data line DL to the pixel electrode PXL in response to a scan signal from the gate line GL. The pixel electrode PXL controls the transmittance of light by driving the liquid crystals, which are located between a common electrode (not shown) and the pixel electrode PXL, in response to the pixel signal. Such liquid crystal cells are alternately connected to the data lines DL, respectively, that are adjacent along a vertical direction through the thin film transistor TFT.

For example, the liquid crystal cells of odd-numbered horizontal lines connected to odd-numbered gate lines GL1, GL3, GL5, . . . are connected to the data line DL adjacent to their left, and receive the pixel signal. The liquid crystal cells of even-numbered horizontal lines connected to even-numbered gate lines GL2, GL4, GL6, . . . are connected to the data line DL adjacent to their right, and receive the pixel signal.

The timing controller 18 generates timing control signals that control the gate driver 14 and the data driver 16, and applies a pixel data signal to the data driver 16. Gate timing control signals generated in the timing controller 18 include a gate start pulse GSP, a gate shift clock signal GSC and a gate output enable signal GOE. Data timing control signals generated in the timing controller 18 include a source start pulse SSP, a source shift clock signal SSC, a source output enable signal SOE and a polarity control signal POL.

The gate driver 14 sequentially applies scan signals to the gate lines GL1 to GLn in use of the gate timing control signals. Accordingly, the gate driver 14 drives the thin film transistors TFT on a horizontal line base in response to the scan signal.

The data driver 16 converts pixel data that is input to analog pixel signals and applies a horizontal line of pixel signals to the data lines DL1 to DLm+1 for each horizontal period when a scan signal is applied to the gate line GL. For example, the data driver 16 may convert the pixel data to the pixel signals using gamma voltages applied from a gamma voltage generator (not shown).

The data driver 16 applies the pixel signal in a column inversion driving system, thereby causing the pixel signal applied to the data line DL1 to DLm+1 to have an opposite polarity to that of the adjacent data line DL, and the polarity to be inverted for each frame. For instance, the data driver 16 applies the pixel signals with opposite polarities to each other to that of the odd-numbered data lines DL1, DL3, . . . , and the even-numbered data lines DL2, DL4, . . . , and inverts the polarity of the pixel signal applied to the data line DL1 to DLm+1 for each frame.

In this case, since the pixel electrode PXL are arranged in a zigzag pattern based upon the data lines DL1 to DLm+1, to which the pixel signal is applied by the column inversion system, the liquid crystal cells including the pixel electrode PXL are driven by a dot inversion system.

Specifically, the data driver 16 alternately changes an output channel of the pixel signal for each horizontal period in order to apply correct pixel signals to the pixel electrodes PXL which are arranged in a zigzag pattern along the data lines DL1 to DLm+1. In other words, in the event that the pixel signal is applied to the liquid crystal cells connected to the right hand of the data lines DL1 to DLm+1, the data driver 16 applies m-number of effective pixel signals to the first to mth data lines DL1 to DLm and applies a blank signal to the (m+1)th data line DLm+1. On the other hand, in the event that the pixel signal is applied to the liquid crystal cells connected to the left hand of the data lines DL1 to DLm+1, the data driver 16 shifts the m-number of effective pixel signals to the right by one channel and then applies the shifted pixel signals to the second to the (m+1)th data lines DL2 to DLm+1 and applies the blank signal to the first data line DL1. Herein, the blank signal represents a signal not defined.

The liquid crystal display has its picture quality improved by the liquid crystal cells driven by the dot inversion system, and the data driver 16 applies the pixel signal by the column inversion system, thus power consumption can be remarkably reduced as compared with that of when the pixel signal is applied in the dot inversion system.

However, in the liquid crystal display panel 12 shown in FIG. 1, there occurs a voltage deviation of a positive polarity or a negative polarity by parasitic capacitors Cdp formed between the data line DL and the pixel electrodes PXL adjacent to the data line DL. Particularly, the data line DL being driven by the column inversion system keeps continuously a polarity for one frame, so that the voltage deviation caused by the parasitic capacitor Cdp or the polarity is kept for one frame. As a result, a vertical crosstalk occurs. A reason for the vertical crosstalk will be discussed in detail with reference to FIGS. 2 and 3.

FIG. 2 illustrates a part of the liquid crystal display panel shown in FIG. 1, and FIG. 3 is a sectional view showing the liquid crystal display panel taken along line I-I' shown in FIG. 2.

The parasitic capacitor Cdp shown in FIG. 2 includes a first parasitic capacitor Cdp1 located between a data line DLk and a left-hand pixel electrode P1 or P3, and a second parasitic electrode Cdp2 formed between the data line DLk and a right-hand pixel electrode P2 or P4. The data line DLk and the pixel electrodes P1 and P2 are located with the passivation film made of an inorganic insulating film or an organic insulating film therebetween, as shown in FIG. 3. The first parasitic capacitor Cdp1 and the second parasitic capacitor Cdp2 are formed in accordance with above result. The data line DLk is formed on a gate insulating film 22 on a lower substrate 20, and a semiconductor layer 24 is further formed, along the data line DLk, between the data line DLk and the gate insulating film 22.

Due to a coupling effect caused by the first and the second parasitic capacitors Cdp1 and Cdp2, a pixel signal supplied to the data line DLk and the pixel electrode P1 and P2 is distorted, which results in the display quality of the liquid crystal display panel being deteriorated. Specifically, the left-hand pixel electrode P1 and the right-hand pixel electrode P2 of the data line DLk are charged by pixel signals having polarities inverted from each other, to thereby generate a capacitance deviation between the first and the second parasitic capacitors Cdp1 and Cdp2. The capacitance deviation of the parasitic capacitors Cdp1 and Cdp2 keeps a polarity for one frame by the data line DLk to maintain the same polarity for one frame, to thereby interfere the data line DLk. As a result, a pixel signal on the data line DLk is distorted. The distorted signal on the data line DLk is induced to adjacent pixel electrodes P1 and P2, to thereby generate a vertical crosstalk and therefore to deteriorate the display quality.

Further, the data line DL and the pixel electrodes P1 and P2 are arranged a designated distance from each other in order to decrease the capacitance of the parasitic capacitor Cdp. As such, light leakage occurs from a backlight between the data line DL and the pixel electrodes P1 and P2 through the liquid crystal not driven. In particular, an amount of the light leakage between the data line DLk and the pixel electrodes P1 and P2 is produced in proportion to the capacitances of the parasitic capacitors Cdp1 and Cdp2. Accordingly, the amount of light leakage becomes different by the capacitance deviation between the first and the second parasitic capacitors Cdp1 and Cdp2. An asymmetric light leakage caused by the first and second parasitic capacitors induces a display quality that is more deteriorated.

SUMMARY OF THE INVENTION

Accordingly, the present invention is directed to a liquid crystal display panel that substantially obviates one or more of the problems due to limitations and disadvantages of the related art.

An advantage of the present invention is to provide a liquid crystal display panel capable of reducing a capacitance of a parasitic capacitor between a pixel electrode and a data line.

Another advantage of the present invention is to provide a liquid crystal display panel capable of reducing a capacitance deviation of a parasitic capacitor between a left and right pixel electrode and a data line.

Another advantage of the present invention is to provide a liquid crystal display panel capable of minimizing an asymmetric light leakage between a left and right pixel electrode and a data line.

Another advantage of the present invention is to provide a liquid crystal display panel capable of minimizing a crosstalk caused by a parasitic capacitor between a pixel electrode and a data line.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes: a thin film transistor at a crossing of a gate line and a data line, liquid crystal cells including a pixel electrode connected to the thin film transistor; shield patterns in the liquid crystal cells, each shield pattern being parallel to the data line without overlapping the data line, wherein the shield patterns are insulated from and overlap with an outer portion of the pixel electrode; and a common line arranged to connect the shield patterns for each of the liquid crystal cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, example of which is illustrated in the accompanying drawings.

Figure 4:
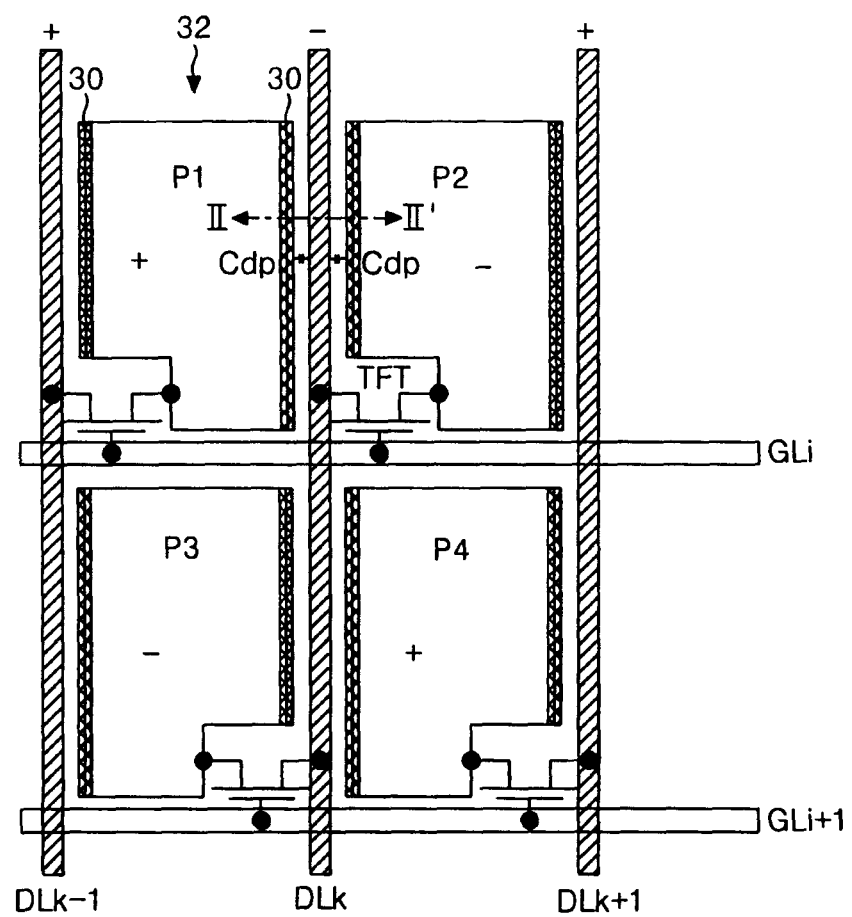
FIG. 4 is a plan view illustrating a part of a liquid crystal display panel associated with the present invention.
Figure 5:
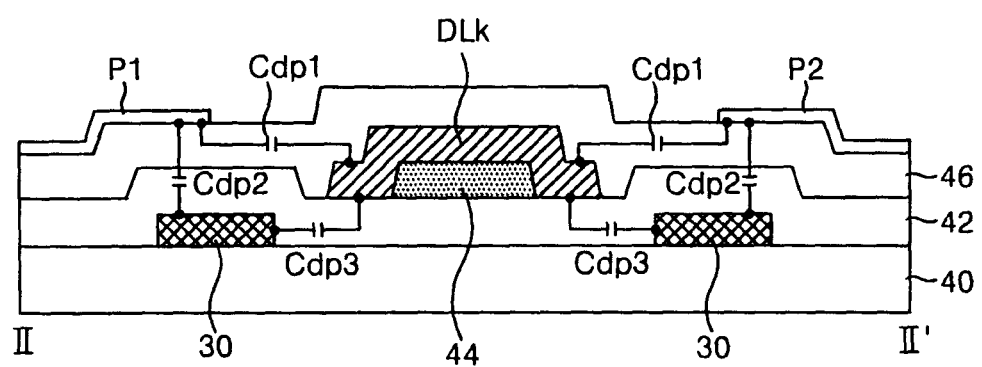
FIG. 5 is a sectional view illustrating the liquid crystal display panel taken along line II-IP shown in FIG. 4.

FIG. 4 is a plan view illustrating a part of a liquid crystal display panel associated with the present invention, and FIG. 5 is a sectional view illustrating the liquid crystal display panel taken along line II-IP shown in FIG. 4.

The liquid crystal display panel includes liquid crystal cells 32 formed at crossings of the gate lines GLi and GLi+1 and the data lines DLk−1 to DLk+1, respectively; and a shield pattern 30 formed to overlap both sides of pixel electrodes P1 to P4 in order to reduce a parasitic capacitor Cdp of the pixel electrodes P1 to P4 and the data lines DLk−1 to DLk+1 in the liquid crystal cells 32.

Figure 1:
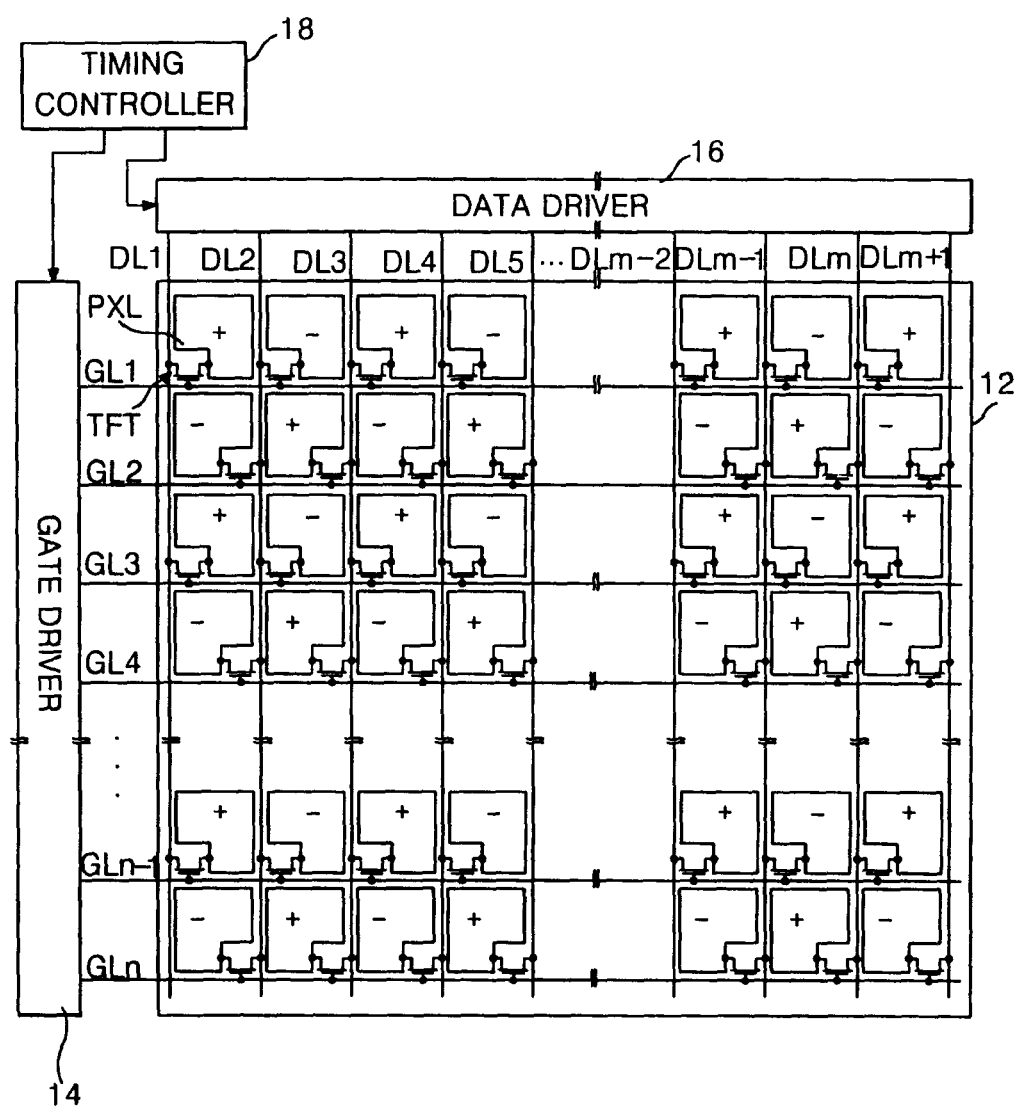
FIG. 1 is a schematic diagram illustrating a liquid crystal display of the related art.
Figure 2:
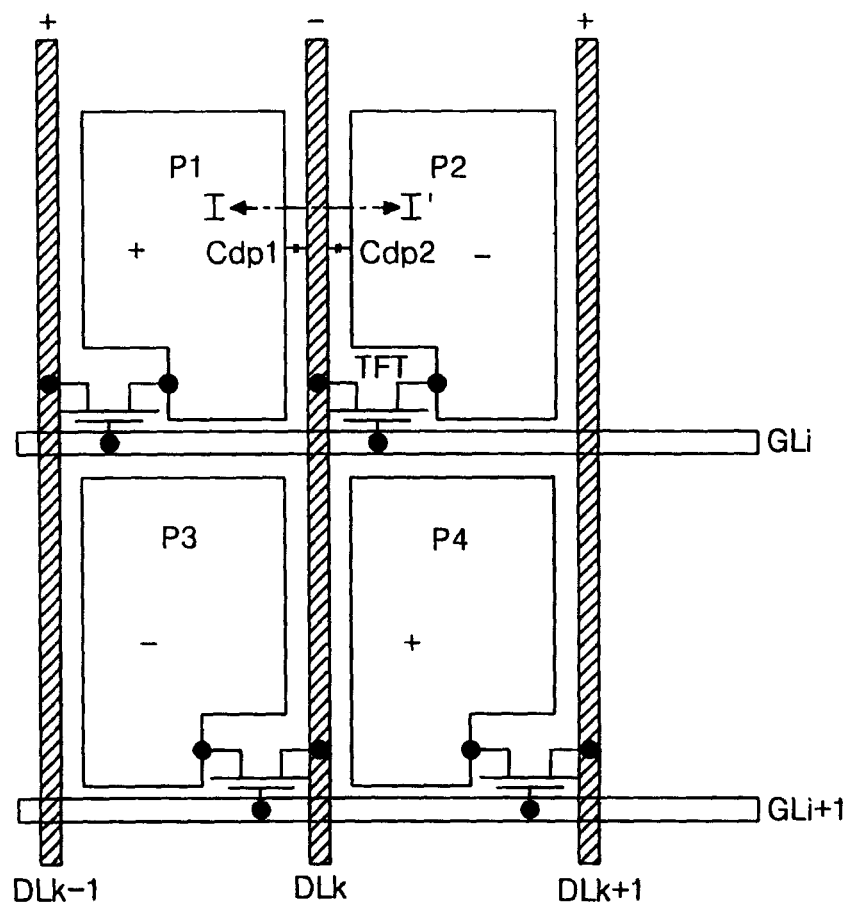
FIG. 2 is a plan view enlarging a part of the liquid crystal display panel shown in FIG. 1.

Referring to FIG. 1 and FIG. 4, each of the liquid crystal cells 32 includes a thin film transistor TFT and a pixel electrode P. The thin film transistor TFT applies a pixel signal from the data line DL to the pixel electrode P in response to a scan signal from the gate line GL. The pixel electrode P drives a liquid crystal arranged between the pixel electrode P and a common electrode, in response to the pixel signal applied thereto. Accordingly, the liquid crystal cell 32 controls the light transmittance of the liquid crystal to display a picture.

In particular, as shown in FIG. 1, the liquid crystal cells 32 are connected in an alternating pattern to the data lines DLk−1 to DLk+1 adjacent to them along a vertical direction for dot inversion driving. In other words, the liquid crystal display panel includes a first horizontal line consisting of the liquid crystal cells 32 connected to the data lines DLk−1, DLk adjacent to their left side, and a second horizontal line consisting of the liquid crystal cells 32 connected to the data lines DLk, DLk+1 adjacent to their right side. In the event that the first and second horizontal lines are driven by a dot inversion system, the first and second horizontal lines are arranged alternately for each horizontal line. For instance, in the event that pixel signals whose polarities are inverted for each data line DLk−1 to DLk+1 are supplied, each of the liquid crystal cells 32 has a pixel signal of a polarity opposite to that of the liquid crystal cells located at its up- and down-direction, and left- and right-hand. Accordingly, the liquid crystal cells 32 can be driven by the dot inversion system.

Alternatively, the first horizontal line HL1 and second horizontal line HL2 may be arranged alternately every two or three horizontal lines when being driven by two or three dot inversion system.

The shield pattern 30 is formed between the data line DL and the pixel electrode P, for example, the shield pattern 30 is parallel to the data line DL without overlapping therewith, while overlapping one side of the pixel electrode P. As shown in FIG. 5, the shield pattern 30 is formed to overlap one side of the pixel electrodes P1 and P2 wherein a passivation film 46 and a gate insulating film 42 are arranged between the shield pattern 30 and the one side of the pixel electrodes P1 and P2. Moreover, the shield pattern 30 is formed parallel with the data line DLk, with the gate insulating film 42 therebetween. The shield pattern 30 is made of a gate metal with the gate line GL and a gate electrode of the TFT on a lower substrate 40. The shield pattern 30 is independently formed for each liquid crystal cell 32, to thereby have a floating state. A semiconductor layer 44 along the data line DLk is further formed between the data line DLk and the gate insulating film 42.

The shield pattern 30 relatively lengthens an interval between the data line DLk and the pixel electrode P1 and P2, to thereby reduce a capacitance of the parasitic capacitor Cdp such that the capacitance is inversely proportional to the interval.

Figure 3:
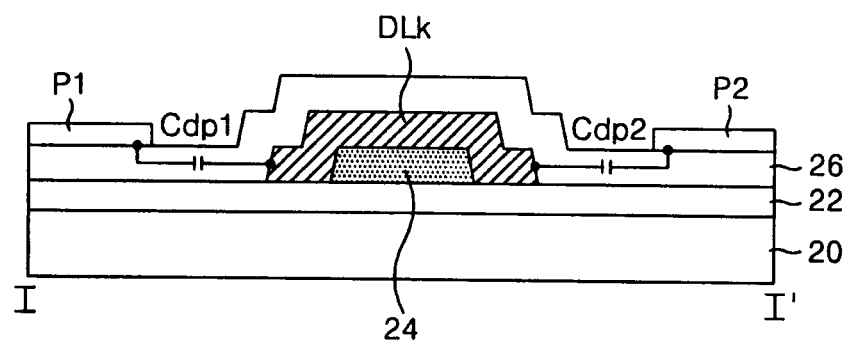
FIG. 3 is a sectional view illustrating the liquid crystal display panel taken along line I-I' shown in FIG. 2.

For instance, in the related art liquid crystal display panel shown in FIG. 3, when the interval between the data line DLk and the pixel electrodes P1 and P2 is lengthened to reduce the parasitic capacitor Cdp, a light leakage through between the data line DLk and pixel electrodes P1 and P2 increases. Therefore, in the related art liquid crystal display panel, the interval between the data line DLk and the pixel electrodes P1 and P2 is limited to less than about 3.5 µm, which is the extent to shield the light leakage with a black matrix (not shown) of an upper substrate.

When the shield pattern 30 is formed as shown in FIG. 5, the light leakage is shielded by the shield pattern 30 and therefore the interval between the data line DLk and the pixel electrodes P1 and P2 can be increased. For example, when the interval between the shield pattern 30 and the data line DLk is set up with about 3 µm, enough to shield the light leakage with the black matrix of the upper substrate, a width of the shield pattern 30 is set up with 5.5 µm and an overlapped width between the shield pattern 30 and the pixel electrodes P1 and P2 is 2.5 µm, the interval between the data line DLk and the pixel electrodes P1 and P2 can be increased up to 6 µm. Therefore, because the interval between the data line DLk and the pixel electrodes P1 and P2 is relatively increased by using the shield pattern 30, a capacitance of the parasitic capacitor Cdp can be reduced accordingly.

Figure 6:
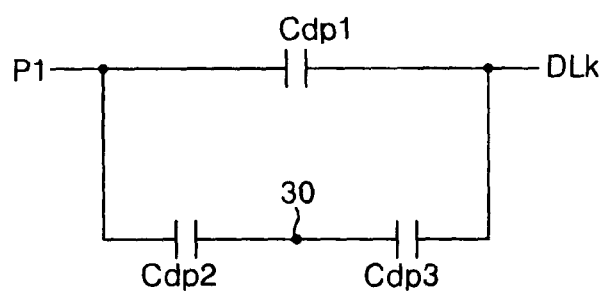
FIG. 6 is an equivalent circuit to the parasitic capacitor shown in FIG. 5.

Each parasitic capacitor Cdp, formed by the shield pattern 30, between the data line DLk and the pixel electrodes P1 and P2 adjacent to the data line DLk includes: a first parasitic capacitor Cdp1 formed by the data line DLk and the pixel electrodes P1 and P2 while disposing the passivation film 46 therebetween; a parasitic capacitor Cdp2 formed by the shield pattern 30 and the pixel electrodes P1 and P3 while disposing the passiviation film 46 and the gate insulating film 42 therebetween; and a third parasitic capacitor Cdp3 formed by the shield pattern 30 and the data line DLk while disposing the gate insulating film 42 therebetween, as shown in FIG. 5. Accordingly, the parasitic capacitor Cdp is equivalently represented as the parallel connection of the second and the third parasitic capacitors Cdp2 and Cdp3 connected in series, and the first parasitic capacitor Cdp1, as shown in FIG. 6. Herein, as the interval between the data line DL and the pixel electrode P is increased, a capacitance of the first parasitic capacitor Cdp1 is relatively reduced. Accordingly, the capacitance of the parasitic capacitor Cdp, including the additional second and the third parasitic capacitors Cdp2 and Cdp3 is reduced.

However, the shield pattern 30 having a floating state is subject to the effects of the data line DL and the pixel electrode P. Accordingly, there is a disadvantage that the capacitance of the parasitic capacitor Cdp is increased pursuant to a pixel signal supplied to the data line DL and the pixel electrode P. According to the present invention, this disadvantage for the shield pattern is solved by commonly applying a bias voltage supplied through a common line of the shield pattern.

Hereinafter, additional embodiments of the present invention will be described in detail with reference to FIGS. 7 to 14G.

Figure 7:
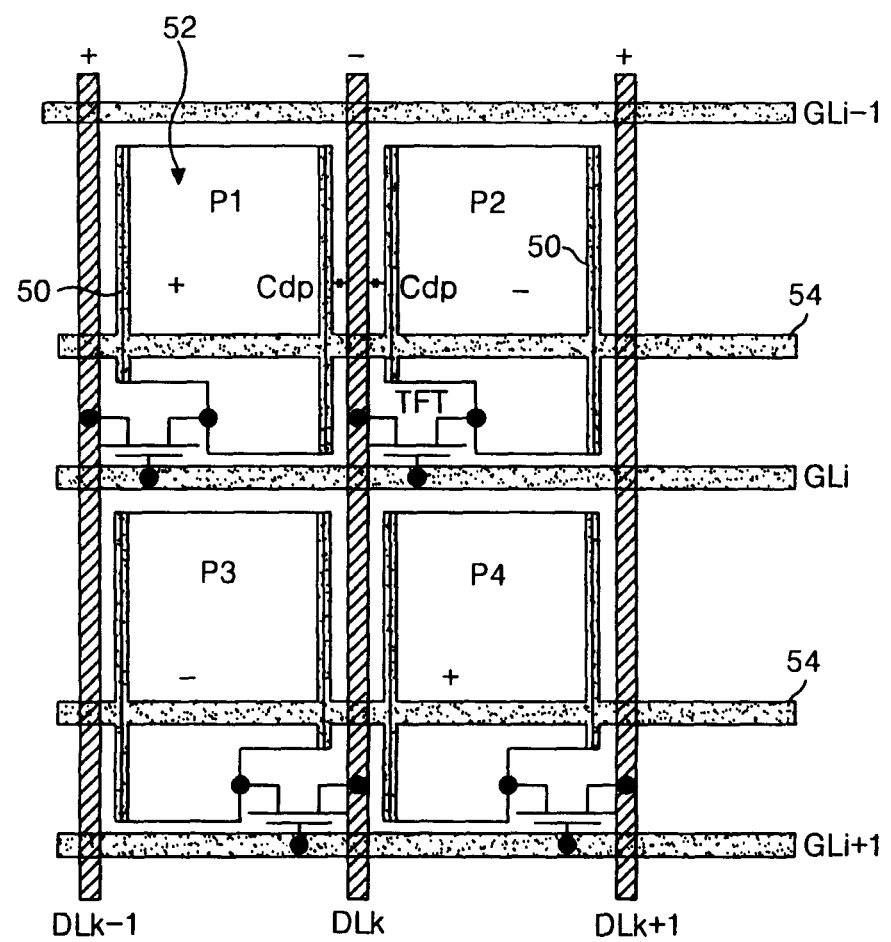
FIG. 7 is a plan view illustrating a part of the liquid crystal display panel according to a first embodiment of the present invention.

FIG. 7 is a plan view illustrating a structure of the liquid crystal display panel according to a first embodiment of the present invention. The liquid crystal display panel shown in FIG. 7 is identical to the liquid crystal display panel shown in FIG. 4 except that it further includes a common line connected to a shield pattern 50. Therefore, a detailed explanation as to the elements identical to those in FIG. 4 will be omitted.

The shield pattern 50 overlapping both side portions of pixel electrodes P1 to P4 is electrically connected to the common line 54 crossing the pixel electrodes P1 to P4. The common line 54 supplies a bias voltage, for example, a common voltage Vcom referenced to drive a liquid crystal or a ground voltage GND, to the shield pattern 50. In the event that the shield pattern 50 is biased, as shown in FIG. 7, any effect caused by the pixel signal of the data line DL on each of the liquid crystal cells 32 is reduced in contrast with the shield pattern 30, of FIG. 4, having the floating state. Further, in the event that a base voltage is not applied to the shield pattern 50, because all of the shield patterns 50 independently formed for each liquid crystal cell 52 are connected through the common line 54, an effect caused by the data line DL on each of the liquid crystal cells 32 is reduced in contrast with the shield pattern 30 having the floating state shown in FIG. 4. Accordingly, it is possible to reduce a capacitance of the parasitic capacitor Cdp between the data line DL and the pixel electrode P.

Figure 8:
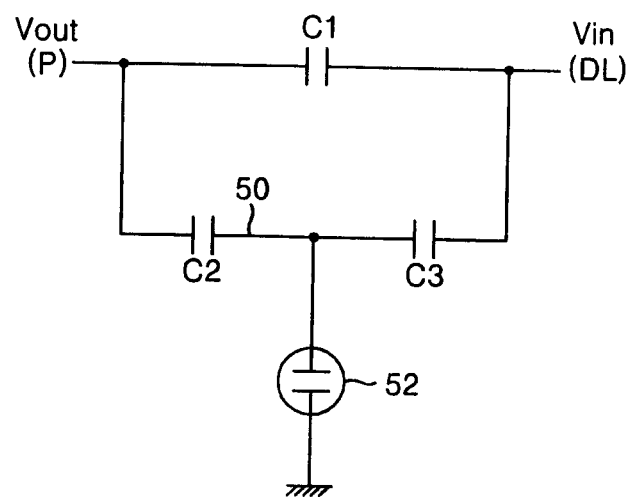
FIG. 8 is a circuit diagram modeling the parasitic capacitor shown in FIG. 7.

Herein, in the event that a bias voltage is supplied to the shield pattern 50, as known from FIG. 8, a reduction of the parasitic capacitor Cdp between the data line DL and the pixel electrode P can be noticed by modeling first to third capacitors C1 to C3 connected between an input terminal corresponding to the data line DL and an output terminal corresponding to the pixel electrode P.

Figure 9A:
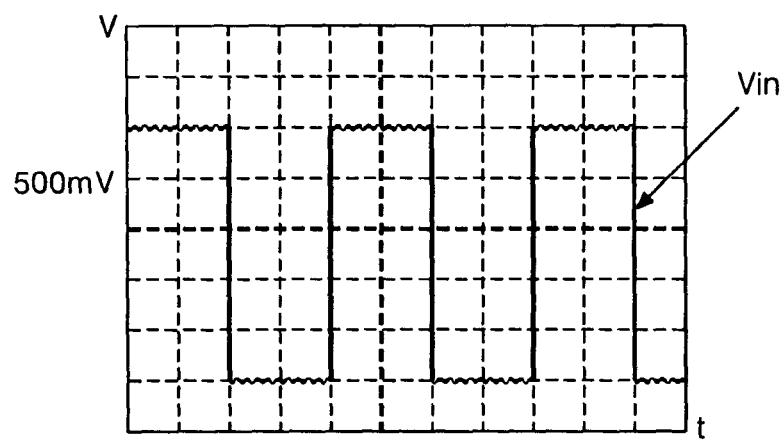
FIGS. 9A and 9B are input and output waveforms of the modeled circuit diagram shown in FIG. 8.
Figure 9B:
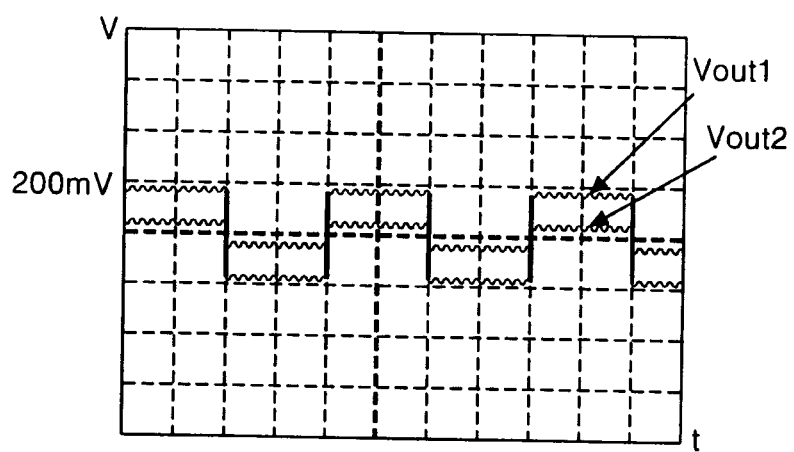

In FIG. 8, the first capacitor C1 is a model of the first parasitic capacitor formed between the data line DL and the pixel electrode P, the second capacitor C2 is a model of the second parasitic capacitor formed between the pixel electrode P and the shield pattern 50, and the third capacitor C3 is a model of the third parasitic capacitor formed between the data line DL and the shield pattern 50. Herein, it is assumed that the first capacitor C1 has a capacitance of 0.5 pF, the second capacitor C2 has a capacitance of 5 pF, and the third capacitor C3 has a capacitance of 1.2 pF. A constant voltage source 52 for supplying a bias voltage is connected to a node between the second capacitor C2 and the third capacitor C3 corresponding to the shield pattern 50. Moreover, as shown in FIG. 9A, an input voltage Vin, which alternates a positive polarity and a negative polarity with a swing width of 2.5V, is supplied to the input terminal corresponding to the data line DL. Then, an output voltage Vout is detected in an output terminal corresponding to the pixel electrode P. As a result, as known from FIG. 9B, a second output voltage Vout2, which alternates the positive polarity and the negative polarity with a swing width of 100 mV, is detected. On the other hand, in the event that the first capacitor C1 is formed between the data line DL and the pixel electrode P without the shield pattern 50, the first output voltage Vout1, shown in FIG. 9B, has a swing width of about 300 mV, which is detected at the output terminal corresponding to the pixel electrode P after supplying the input voltage as shown in FIG. 9A to the input terminal corresponding to the data line DL. Accordingly, the second output voltage Vout2, using the biased shield pattern 50, is reduced by a level of about ⅓ than the first output voltage Vout1 without using the biased shield pattern 50. Moreover, since the second output voltage Vout2 has no concern with a level of bias voltage of the constant voltage source 52, the parasitic capacitor Cdp between the data line DL and the pixel electrode P with the biased shield pattern 50 therebetween is more reduced than the related art without the shield pattern 50.

As the capacitance of the parasitic capacitor Cdp is decreased, a coupling effect between the data line DL and the pixel electrode P caused by the parasitic capacitor Cdp can be reduced. Moreover, as the capacitance of the parasitic capacitor Cdp is reduced, a capacitance deviation of the parasitic capacitor Cdp between the data line and the left-hand and right-hand pixel electrodes P is also reduced. Therefore, vertical crosstalk and an asymmetric light leakage caused by the capacitance deviation can be reduced. Particularly, in the event that a common voltage Vcom is supplied to the shield pattern 50 through the common line 54, it is possible that a direct current voltage is prevented from being supplied between the shield pattern 50 and the upper common electrode (not shown). As such, it is possible to prevent the crosstalk and light leakage caused by the deterioration of the liquid crystal due to an electric field between the shield pattern 50 and the upper common electrode (not shown).

The shield pattern 50 and the common line 54 shown in FIG. 7 are integral and are made of a gate metal identical to the gate line GL. Further, the shield pattern 50 and the common line 54 may be made of a combination of the gate metal and a source/drain metal identical to the data line DL. In this case, a part of the common line 54 crossing the data line DL may be made of the gate metal for insulating therefrom. The common line 54 made of the gate metal is connected to the common line 54 made of the source/drain metal, via a connection electrode passing through the insulating film.

Further, as shown in FIG. 7, a storage capacitor is formed at each overlapping part of the shield pattern 50 and the pixel electrodes P1 to P4 and at each overlapping part of the common line 54 and the pixel electrodes P1 to P4. The storage capacitor has a large capacitance in proportion to an area of the overlapping parts of the shield pattern 50 and the pixel electrodes P1 to P4 and an area of the overlapping parts of the common line 54 and the pixel electrodes P1 to P4. Therefore, it is possible to stabilize a pixel signal supplied to each of the pixel electrodes P1 to P4.

FIGS. 10A to 10G illustrate a variety of exemplary structures of the shield pattern and the common line applicable to the liquid crystal display panel according to the first embodiment of the present invention.

Figure 10A:
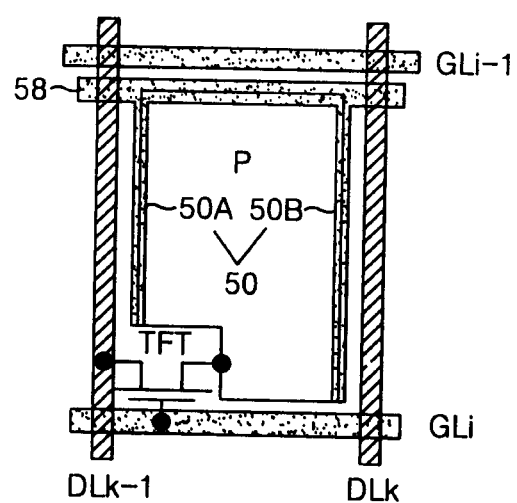
FIGS. 10A to 10G are plan views illustrating various types of the shield patterns and the common lines shown in FIG. 7.

Referring to FIG. 10A, the shield pattern 50 includes first and second shield patterns 50A and 50B that are parallel to the data lines DLk−1 and DLk without overlapping each other and overlap both side portions of the pixel electrode P. A common line 58, integral with the shield pattern 50, is parallel with the gate line GLi–1 of a previous stage without overlapping and is overlapped an upper portion of the pixel electrode P.

Figure 10B:
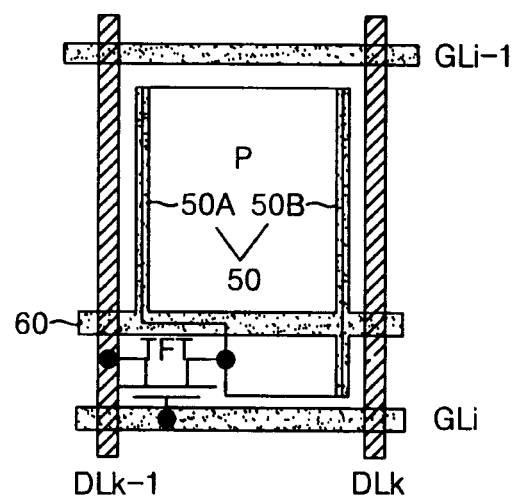

Referring to FIG. 10B, the shield pattern 50 includes first and second shield patterns 50A and 50B which are parallel to the data lines DLk–1 and DLk without overlapping and overlap both side portions of the pixel electrode P as shown in FIG. 10A. A common line 60, integral with the shield pattern 50, is overlapped with a lower portion of pixel electrode P adjacent over a thin film transistor TFT.

Figure 10C:
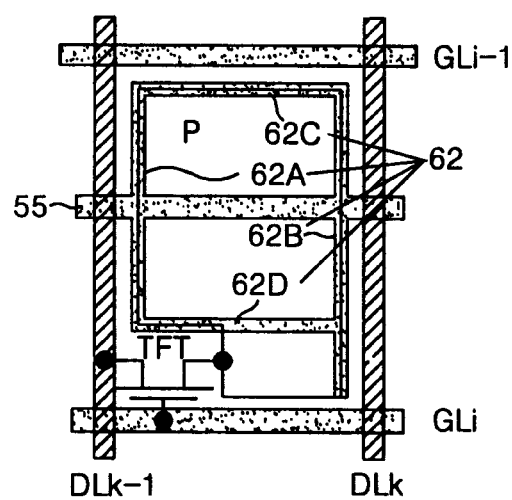

Referring to FIG. 10C, a shield pattern 62 includes: first and second shield patterns 62A and 62B which are parallel with the data lines DLk–1 and DLk without overlapping each other and overlap both side portions of the pixel electrode P; a third shield pattern 62C overlapped with an upper portion of the pixel electrode P which is parallel with the gate line GLi–1 of a previous stage without overlapping the gate line Gli–1; and a fourth shield pattern 62D overlapped with a lower portion of the pixel electrode P adjacent over a thin film transistor TFT. A common line 55, which is integral with the shield pattern 62, crosses a center portion of the pixel electrode P to overlap the pixel electrode P.

Figure 10D:
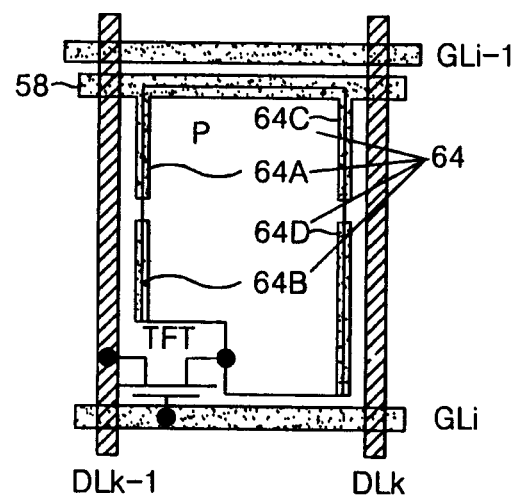

Referring to FIG. 10D, a shield pattern 64 includes first to fourth shield patterns 64A, 64B, 64C and 64D which are parallel with the data lines DLk–1 and DLk without overlapping the data lines DLk–1 and DLk, and which overlap both side portions of the pixel electrode P and are separated from each other. The common line 58 is integral with the first and the third shield patterns 64A and 64C and overlaps an upper portion of pixel electrode P which is parallel to the gate line GLi–1 of a previous stage without overlapping the gate line Gli–1.

Figure 10E:
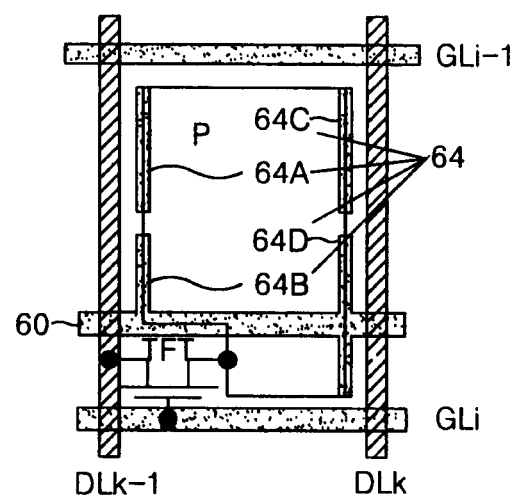

Referring to FIG. 10E, the shield pattern 64 includes the first to the fourth shield patterns 64A, 64B, 64C and 64D which are parallel to the data lines DLk–1 and DLk without overlapping the data lines DLk–1 and DLk, and which overlap both side portions of the pixel electrode P and are separated from each other, as shown in FIG. 10D. The common line 60 is integral with the second and the fourth shield patterns 64B and 64D and overlaps a lower portion of pixel electrode P adjacent over the TFT.

Figure 10F:
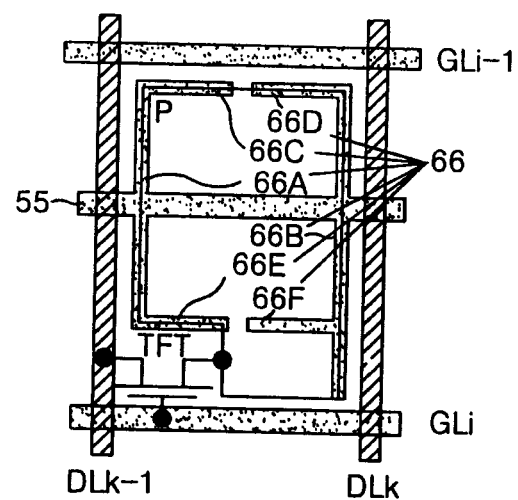

Referring to FIG. 10F, a shield pattern 66 includes: first and second shield patterns 66A and 66B which are parallel to the data lines DLk–1 and DLk without overlapping the data lines DLk–1 and DLk, and which overlap both side portions of the pixel electrode P; third and fourth shield patterns 66C and 66D which overlap with an upper portion of the pixel electrode P parallel with the gate line GLi–1 of a previous stage without overlapping each other and which are separated from each other; and fifth and sixth shield patterns 66E and 66F which are overlapped with a lower portion of the pixel electrode P adjacent over TFT and which are separated from each other. The common line 55, which is integral with the shield pattern 66, crosses a center portion of the pixel electrode P to overlap the pixel electrode P.

Figure 10G:
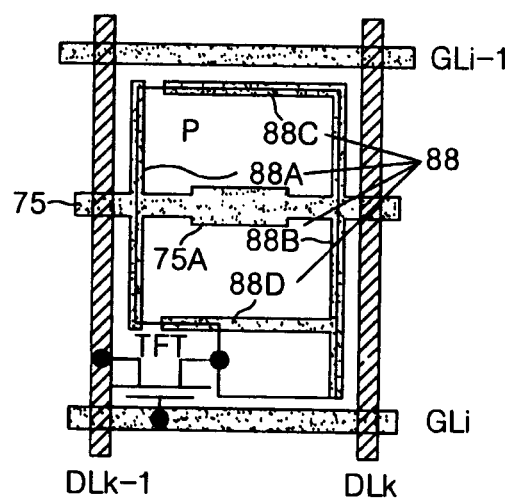

In FIG. 10G, a shield pattern 68 includes: first and second shield patterns 68A and 68B which are parallel to the data lines DLk–1 and DLk without overlapping the data lines DLk–1 and DLk and which overlap both side portions of the pixel electrode P; a third shield pattern 68C overlaps an upper portion of the pixel electrode P parallel to the gate line GLk–1 of a previous stage without overlapping the gate line GLk–1 of the previous stage, and which is separated from the first shield pattern 68A and is integral with the second shield pattern 68B; and a fourth shield pattern 68D which is overlapped with a lower portion of the pixel electrode P adjacent over TFT, and which is separated from the first shield pattern 68A and is integral with the second shield pattern 68B. The common line 55, which is integral with the shield pattern 68, crosses the center portion of the pixel electrode P to overlap the pixel electrode P.

Figure 11:
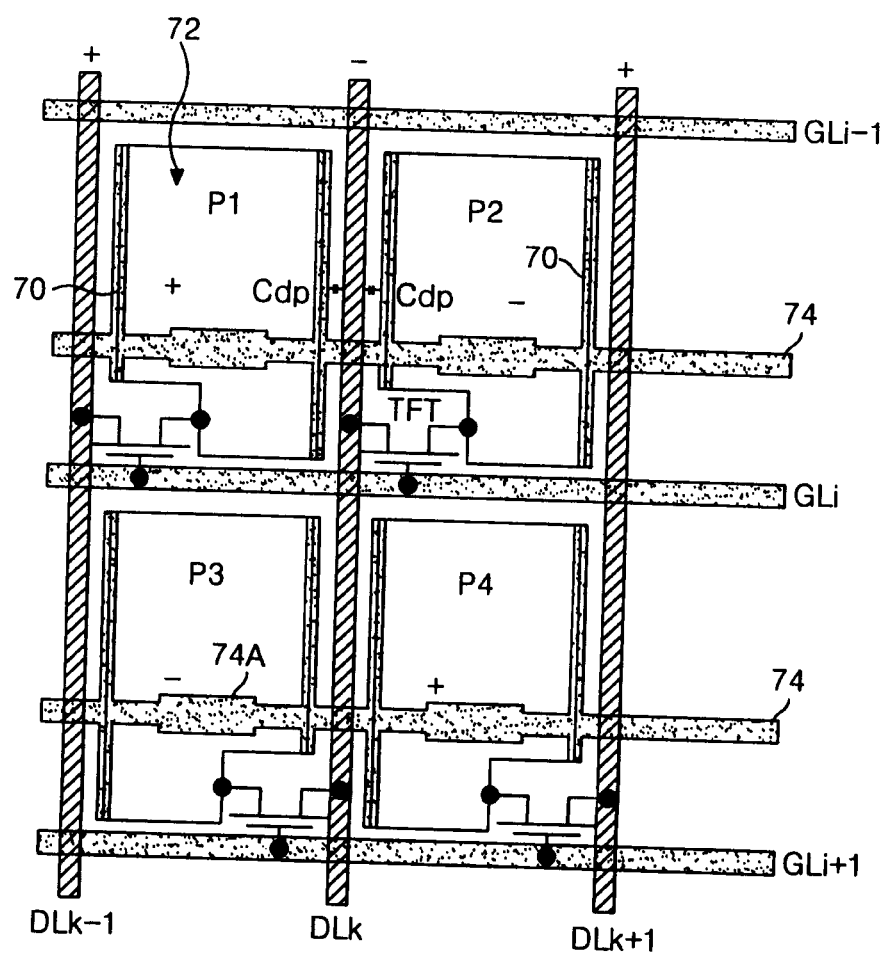
FIG. 11 is a plan view illustrating a part of the liquid crystal display panel according to a second embodiment of the present invention.

FIG. 11 illustrates a part of the liquid crystal display panel according to a second embodiment of the present invention. The liquid crystal display panel shown in FIG. 11 is identical, except that it further has an expanded part 74A having an enlarged line width for enlarging the area overlapped between a common line 74 and pixel electrodes P1 to P4, when compared to the liquid crystal display panel shown in FIG. 7. Therefore, explanation of elements identical to those of FIG. 7 will be omitted.

A shield pattern 70 shown in FIG. 11 is connected to the common line 74 crossing the pixel electrodes P1 to P4. A bias voltage, for example, a common voltage Vcom referenced to drive a liquid crystal or a ground voltage GND is provided to the shield pattern 70. Although the base voltage is not applied to the shield pattern 70, all of the shield patterns 70 independently formed for each liquid crystal cell 72 are connected by the common line 74. Accordingly, an effect on the shield pattern 70 by the data line DL is lowered, to thereby reduce a capacitance of the parasitic capacitor Cdp between the data line DL and the pixel electrode P.

Particularly, as a line width of the common line 74 shown in FIG. 11 is enlarged by the expanded part 74A, an area of the overlapping areas of the common line 74 and the pixel electrodes P1 to P4 is enlarged. Accordingly, a capacitance of a storage capacitor, formed at each overlapping part of the shield pattern 70 and the pixel electrodes P1 to P4 and at each overlapping part of the common line 74 and the pixel electrodes P1 to P4, is enlarged, to thereby further achieve the stabilization of a pixel signal supplied to each of the pixel electrodes P1 to P4.

FIGS. 12A to 12G illustrate a variety of exemplary structures of the shield pattern and the common line applicable to the liquid crystal display panel according to a second embodiment of the present invention.

Figure 12A:
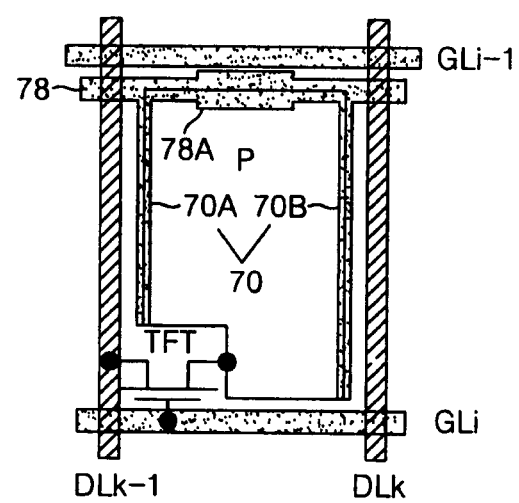
FIGS. 12A to 12G are plan views illustrating various types of the shield patterns and the common lines shown in FIG. 11.

Referring to FIG. 12A, a shield pattern 70 includes first and second shield patterns 70A and 70B that are parallel to the data lines DLk–1 and DLk without overlapping the data lines DLk–1 and DLk and that overlap both side portions of the pixel electrode P. A common line 78, integral with the shield pattern 50, is parallel to the gate line GLi–1 of a previous stage without overlapping the gate line Gli–1 of the previous stage and overlaps an upper portion of the pixel electrode P. Moreover, the common line 78 includes an expanded part 78A having an enlarged line width, to thereby enlarge an overlapping area of the pixel electrode P and the common line 78.

Figure 12B:
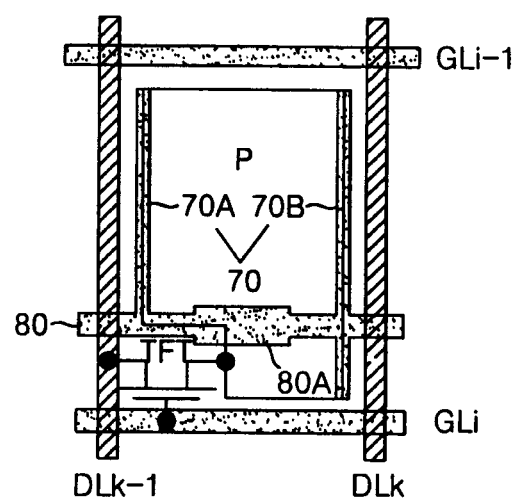

In FIG. 12B, a shield pattern 70 includes first and second shield patterns 70A and 70B which are parallel to the data lines DLk–1 and DLk without overlapping each other and which overlap both side portions of the pixel electrode P as shown in FIG. 12A. A common line 80, integral with the shield pattern 70, overlaps a lower portion of pixel electrode P adjacent over a thin film transistor TFT. Moreover, the common line 80 includes an expanded part 80A having an enlarged line width, to thereby enlarge an overlapping area of the pixel electrode P and the common line 80.

Figure 12C:
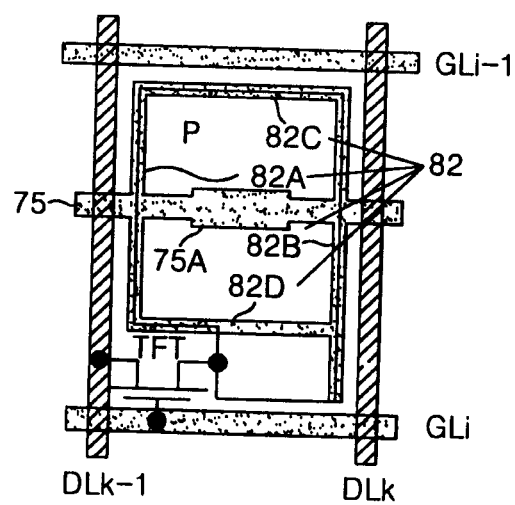

In FIG. 12C, a shield pattern 82 includes: first and second shield patterns 82A and 82B which are parallel to the data lines DLk–1 and DLk without overlapping each other and which overlap both side portions of the pixel electrode P; a third shield pattern 82C which overlaps an upper portion of the pixel electrode P parallel to the gate line GLi–1 of a previous stage without overlapping each other; and a fourth shield pattern 82D which overlaps a lower portion of the pixel electrode P adjacent the TFT. A common line 75, integral with the shield pattern 82, crosses center portion of the pixel electrode P and overlaps the pixel electrode P. Moreover, the common line 75 includes an expanded part 75A having an enlarged line width, to thereby enlarge an overlapping area of the pixel electrode P and the common line 75.

Figure 12D:
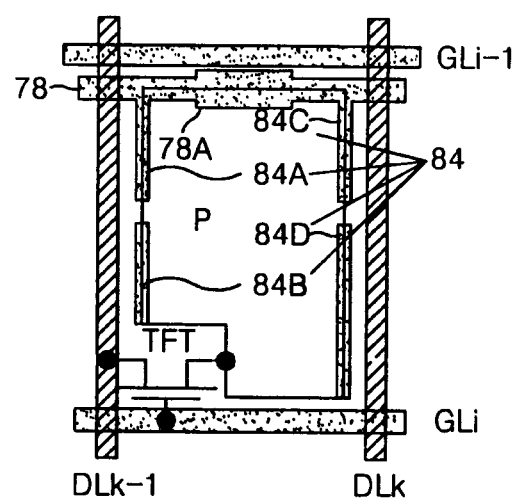

In FIG. 12D, a shield pattern 84 includes first to fourth shield patterns 84A, 84B, 84C and 84D which are parallel to the data lines DLk−1 and DLk without overlapping, and which overlap both side portions of the pixel electrode P and are separated from each other. The common line 78, integral with the first and the third shield patterns 84A and 84C, among the shield patterns 84 is overlapped with an upper portion of pixel electrode P parallel with the gate line GLi−1 of a previous stage without overlapping. Moreover, the common line 78 includes an expanded part 78A having an enlarged line width, to thereby enlarge an overlapping area of the pixel electrode P and the common line 78.

Figure 12E:
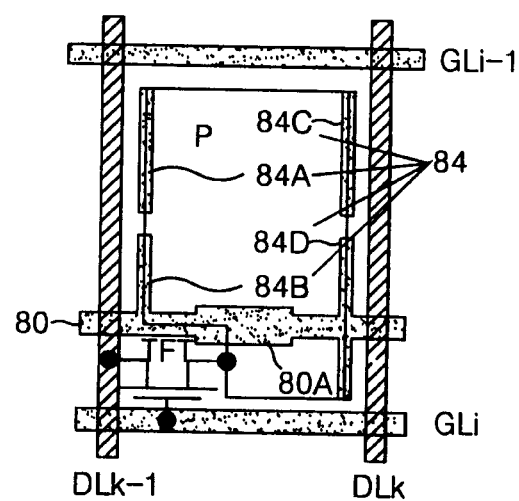

In FIG. 12E, a shield pattern 84 includes first to fourth shield patterns 84A, 84B, 84C and 84D which are parallel to the data lines DLk−1 and DLk without overlapping, which overlap both side portions of the pixel electrode P, and are separated from each other, as shown in FIG. 12D. The common line 80, integral with the second and the fourth shield patterns 84B and 84D, among the shield patterns 84 is overlapped with a lower portion of pixel electrode P adjacent over the TFT. Moreover, the common line 80 includes an expanded part 80A having an enlarged line width, to thereby enlarge an overlapping area of the pixel electrode P and the common line 80.

Figure 12F:
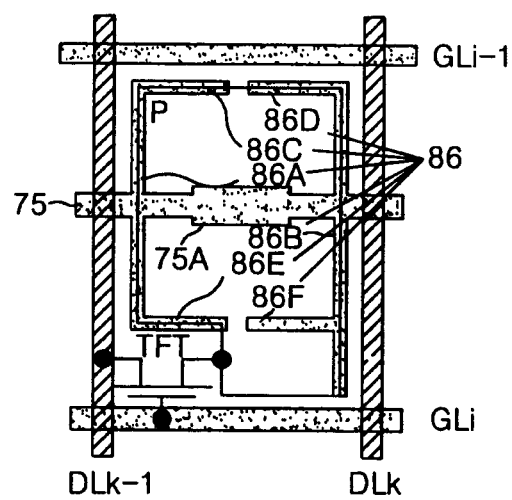

In FIG. 12F, a shield pattern 86 includes: first and second shield patterns 86A and 86B which are parallel to the data lines DLk−1 and DLk without overlapping and which overlap both side portions of the pixel electrode P; third and fourth shield patterns 86C and 86D that overlap an upper portion of the pixel electrode P parallel with the gate line GLi−1 of previous stage without overlapping and which are separated from each other; and fifth and sixth shield patterns 86E and 86F which overlap a lower portion of the pixel electrode P adjacent over the TFT and which are separated from each other. The common line 75, which is integral with the shield pattern 86, crosses the center portion of the pixel electrode P to overlap the pixel electrode P. Moreover, the common line 75 includes an expanded part 75A whose line width is enlarged, to thereby enlarge an overlapping area of the pixel electrode P and the common line 75.

Figure 12G:
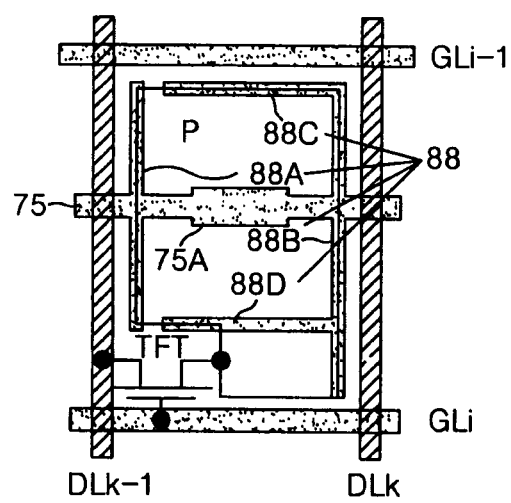

In FIG. 12G, a shield pattern 88 includes: first and second shield patterns 88A and 88B which are parallel to the data lines DLk−1 and DLk without overlapping and which overlap both side portions of the pixel electrode P; a third shield pattern 88C which overlaps an upper portion of the pixel electrode P parallel to the gate line GLi−1 of a previous stage without overlapping, and which is separated from the first shield pattern 88A and is integral with the second shield pattern 88B; and a fourth shield pattern 88D which overlaps a lower portion of the pixel electrode P adjacent over the TFT, and which is separated from the first shield pattern 88A and is integral with the second shield pattern 88B. The common line 75, which is integral with the shield pattern 88, crosses the center portion of the pixel electrode P to overlap the pixel electrode P. Moreover, the common line 75 includes an expanded part 75A whose line width is enlarged, to thereby enlarge an overlapping area of the pixel electrode P and the common line 75.

Figure 13:
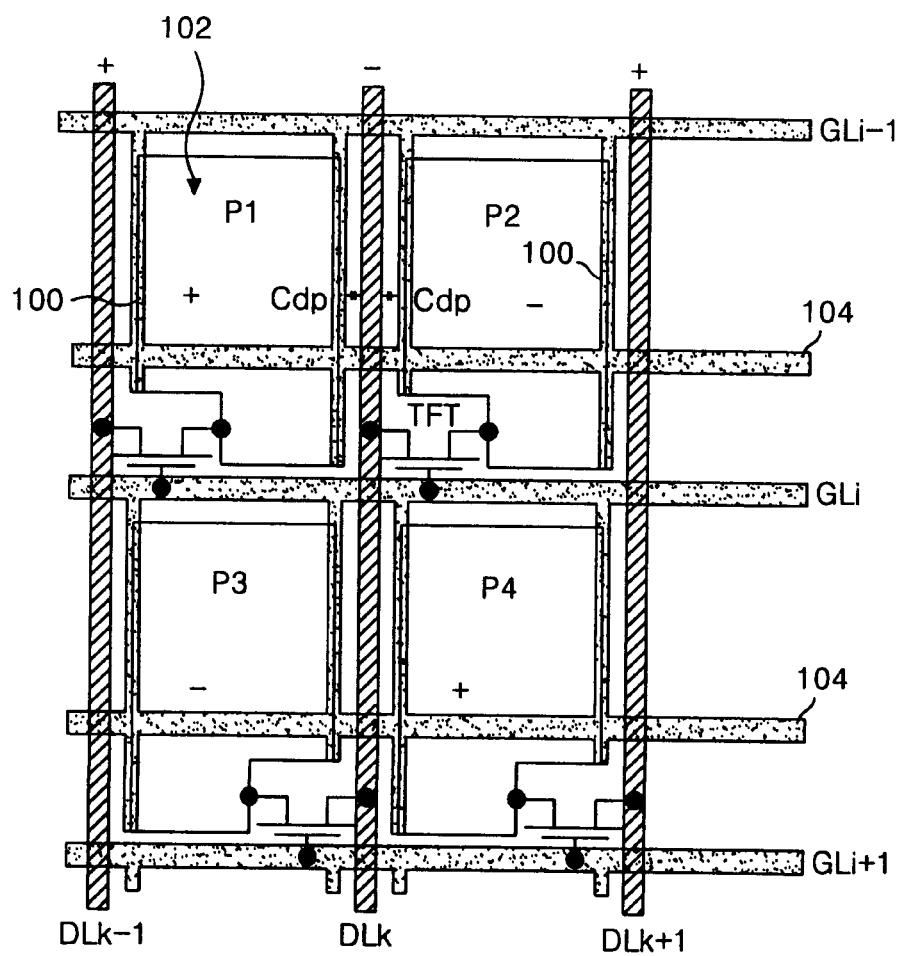
FIG. 13 is a plan view illustrating a part of the liquid crystal display panel according to a third embodiment of the present invention.

FIG. 13 illustrates a third embodiment of the present invention. The liquid crystal display panel shown in FIG. 13 is identical, except that a shield pattern 100, which is connected to a common line 104, is electrically connected to the gate line GLi−1 of a previous stage, to the liquid crystal display panel shown in FIG. 7. Therefore, an explanation on elements identical to those of FIG. 7 will be omitted to avoid duplication.

The shield pattern 100 shown in FIG. 13 is connected to the common line 104 that crosses the pixel electrodes P1 to P4 and is electrically connected to the gate line GLi−1 of a previous stage. Accordingly, gate signals to be supplied to the gate line GL, that is, a high gate voltage for turning-on the thin film transistor TFT and a low gate voltage for turning-off the TFT are supplied to the shield pattern 100 and the common line 104 as a bias signal. In general, the high gate voltage is supplied only for a driving period of one horizontal line within one frame, and the low gate voltage is supplied for a remaining period. Therefore, the low gate voltage is provided to the shield pattern 100 for almost a period. Accordingly, a reduction of the parasitic capacitor Cdp between the data line and the pixel electrode P can be reduced by the biased shield pattern 100.

FIGS. 14A to 14G illustrate a variety of exemplary structures of the shield pattern and the common line applicable to the liquid crystal display panel of the third embodiment of the present invention.

Figure 14A:
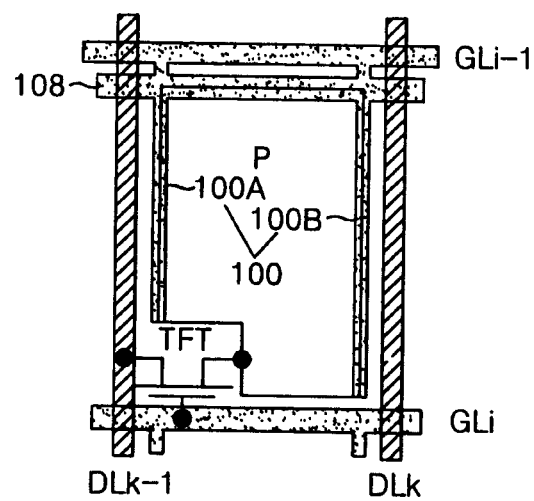
FIGS. 14A to 14G are plan views illustrating various types of the shield patterns and the common lines shown in FIG. 13.

Referring to FIG. 14A, the shield pattern 100 includes first and second shield patterns 100A and 100B that are parallel to the data lines DLk−1 and DLk without overlapping and that overlap both side portions of the pixel electrode P. A common line 108, integral with the shield pattern 100, is parallel to the gate line GLi−1 of a previous stage without overlapping and overlaps an upper portion of the pixel electrode P. Moreover, the common line 108 is connected to the gate line GLi−1 of previous stage.

Figure 14B:
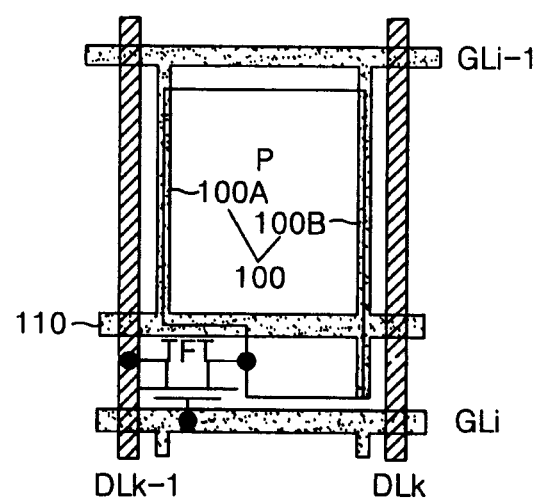

Referring to FIG. 14B, the shield pattern 100 includes first and second shield patterns 100A and 100B that are parallel to the data lines DLk−1 and DLk without overlapping and that overlap both side portions of the pixel electrode P as shown in FIG. 14A. Moreover, the shield pattern 100 is connected to the gate line GLi−1 of a previous stage via the first and the second shield patterns 100A and 100B. A common line 110, integral with the shield pattern 100, is overlapped with a lower portion of pixel electrode P adjacent over a thin film transistor TFT.

Figure 14C:
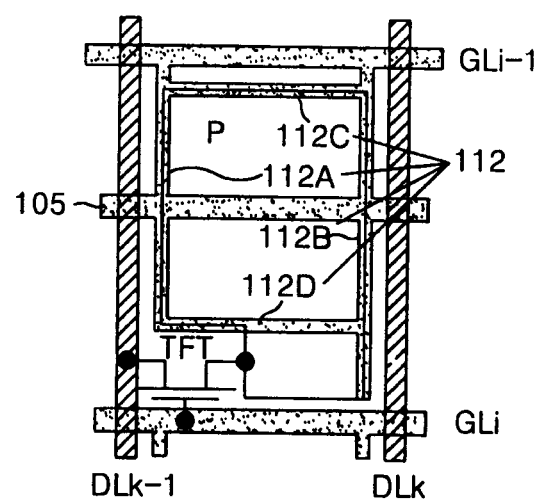

In FIG. 14C, a shield pattern 112 includes: first and second shield patterns 112A and 112B that are parallel to the data lines DLk−1 and DLk without overlapping and that overlap both side portions of the pixel electrode P; a third shield pattern 112C overlaps an upper portion of the pixel electrode P and is parallel to the gate line GLi−1 of a previous stage without overlapping; and a fourth shield pattern 112D which overlaps a lower portion of the pixel electrode P adjacent over TFT. Moreover, the shield pattern 112 is connected to the gate line GLi−1 of the previous stage via the first and the second shield patterns 112A and 112B. A common line 105, which is integral with the shield pattern 112, crosses a center portion of the pixel electrode P to overlap with the pixel electrode P.

Figure 14D:
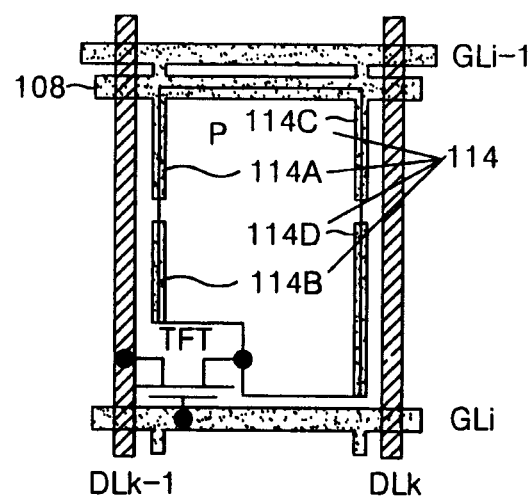

In FIG. 14D, a shield pattern 114 includes first to fourth shield patterns 114A, 114B, 114C and 114D that are parallel to the data lines DLk−1 and DLk without overlapping, and that overlap a both side portions of the pixel electrode P and are separated from each other. The common line 108 connected to the first and the third shield patterns 114A and 114C among the shield patterns 114 is overlapped with the upper portion of pixel electrode P parallel with the gate line GLi−1 of a previous stage without overlapping and is connected to the gate line GLi−1 of previous stage.

Figure 14E:
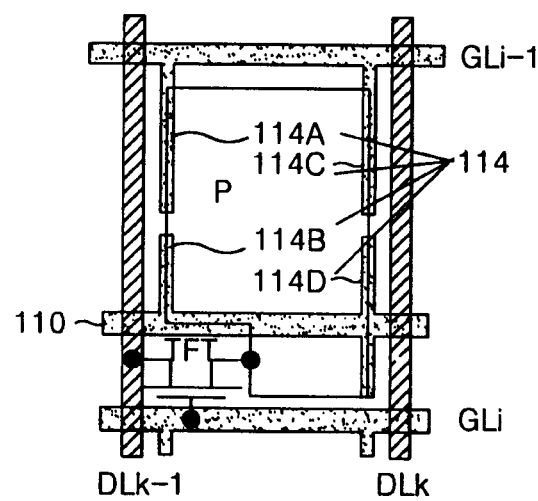

In FIG. 14E, the shield pattern 114 includes first to fourth shield patterns 114A, 114B, 114C and 114D that are parallel to the data lines DLk−1 and DLk without overlapping, and that overlap with both side portions of the pixel electrode P and are separated from each other. The first and the third shield patterns 114A and 114C among the shield patterns 114 are connected to the gate line GLi−1 of a previous stage. The common line 110 connected to the second and the fourth shield patterns 114B and 114D among the shield patterns 114 overlaps a lower portion of pixel electrode P adjacent over the TFT. In this case, a gate signal is supplied to the first and the second shield patterns 114A and 114B via the gate line GLi−1 of the previous stage. Moreover, a bias voltage such as a low gate voltage, a common voltage Vcom and a ground voltage are supplied to the third and the fourth shield patterns 114C and 114D via the common line 110 or the bias voltage is not supplied separately.

Figure 14F:
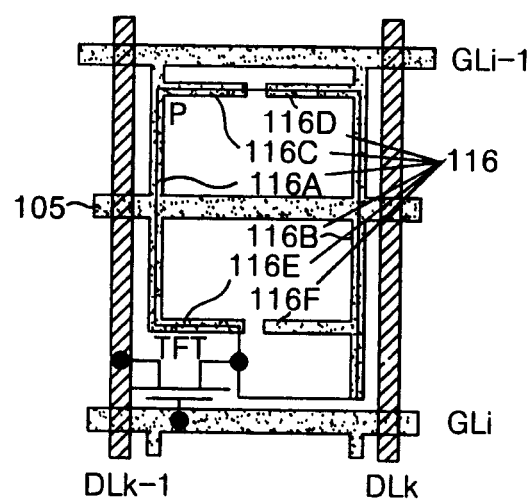

In FIG. 14F, a shield pattern 116 includes: first and second shield patterns 116A and 116B which are parallel to the data lines DLk−1 and DLk without overlapping and which overlap both side portions of the pixel electrode P; third and fourth shield patterns 116C and 116D which overlap an upper portion of the pixel electrode P parallel with the gate line GLi−1 of a previous stage without overlapping and which are separated from each other; and fifth and sixth shield patterns 116E and 116F which overlap a lower portion of the pixel electrode P adjacent over TFT and are separated from each other. Moreover, the shield pattern 116 is connected to the gate line GLi−1 of previous stage via the first and the second shield patterns 116A and 116B. The common line 105, which is integral with the shield pattern 116, crosses the center portion of the pixel electrode P to overlap the pixel electrode P.

Figure 14G:
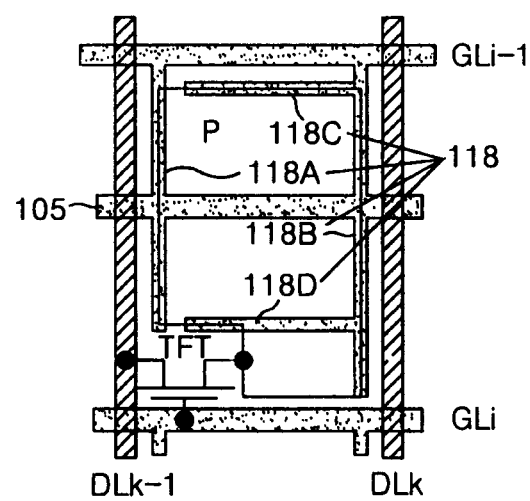

In FIG. 14G, a shield pattern 118 includes: first and second shield patterns 118A and 118B which are parallel to the data lines DLk−1 and DLk without overlapping and which overlap both side portions of the pixel electrode P; a third shield pattern 118C which overlaps an upper portion of the pixel electrode P parallel with the gate line GLi−1 of a previous stage without overlapping, and which is separated from the first shield pattern 118A and integral with the second shield pattern 118B; and a fourth shield pattern 118D which overlaps a lower portion of the pixel electrode P adjacent a TFT, and which is separated from the first shield pattern 118A and is integral with the second shield pattern 118B. Moreover, the shield pattern 118 is connected to the gate line GLi−1 of a previous stage via the first and the second shield patterns 118A and 118B. The common line 105, which is integral with the shield pattern 118, crosses the center portion of the pixel electrode P to overlap with the pixel electrode P.

Figure 15:
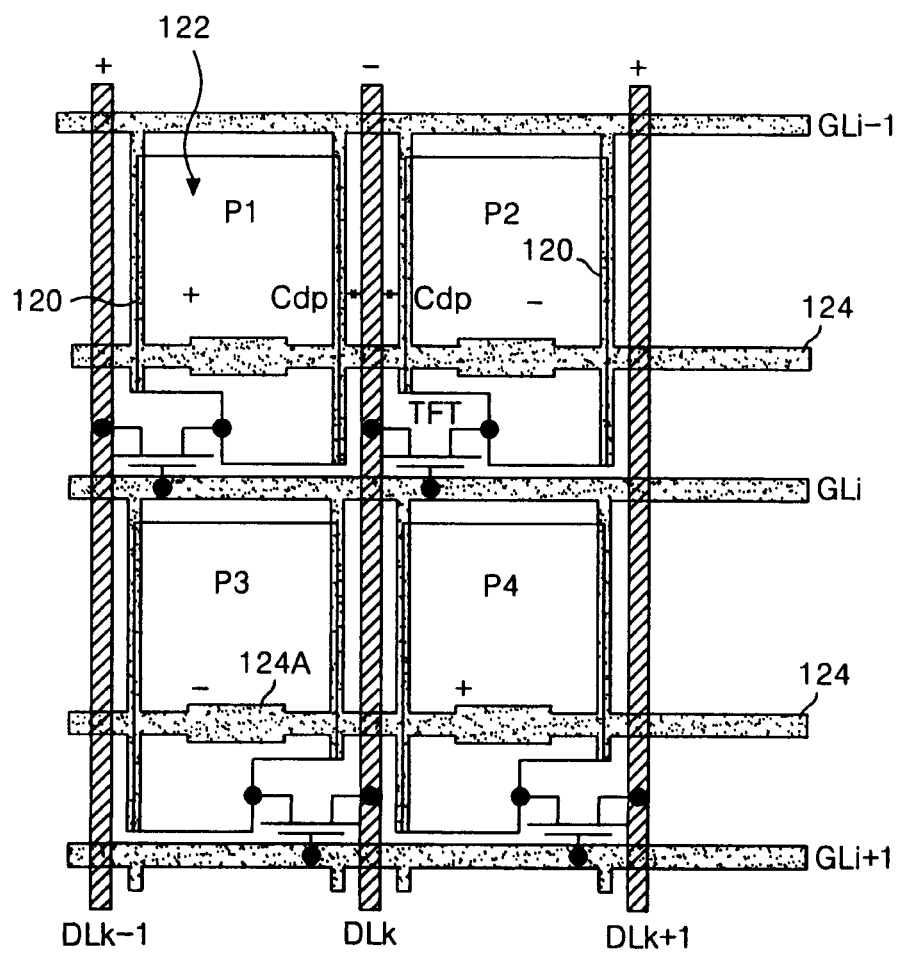
FIG. 15 is a plan view illustrating a part of the liquid crystal display panel according to a fourth embodiment of the present invention.

FIG. 15 illustrates a fourth embodiment of the present invention. The liquid crystal display panel shown in FIG. 15 is identical to the liquid crystal display panel shown in FIG. 13 except that it further includes an expanded part 124A whose line width is enlarged for enlarging the area overlapped between a common line 124 and pixel electrodes P1 to P4. Therefore, an explanation on elements identical to those FIG. 13 will be omitted.

The shield pattern 120 shown in FIG. 15 is connected to the common line 124 that crosses the pixel electrodes P1 to P4 and is electrically connected to the gate line GLi−1 of a previous stage. Accordingly, a high gate voltage and a low gate voltage supplied to the gate line GL are supplied to the shield pattern 120 and the common line 124 as a bias signal. As a result, it is possible to reduce a capacitance of the parasitic capacitor Cdp between the data line DL and the pixel electrode P by the biased shield pattern 120.

Particularly, as a line width of the common line 124 shown in FIG. 15 is enlarged at the expanded part 124A, each overlapping area with the pixel electrodes P1 to P4 is enlarged. Accordingly, a capacitance of a storage capacitor, formed at each overlapping part of the shield pattern 120 and the pixel electrodes P1 to P4 and at each overlapping part of the common line 124 and the pixel electrodes P1 to P4, is enlarged, to thereby better stabilize a pixel signal supplied to each of the pixel electrodes P1 to P4.

FIGS. 16A to 16G illustrate a variety of exemplary structures of the shield pattern and the common line applicable to a liquid crystal display panel according to the fourth embodiment of the present invention.

Figure 16A:
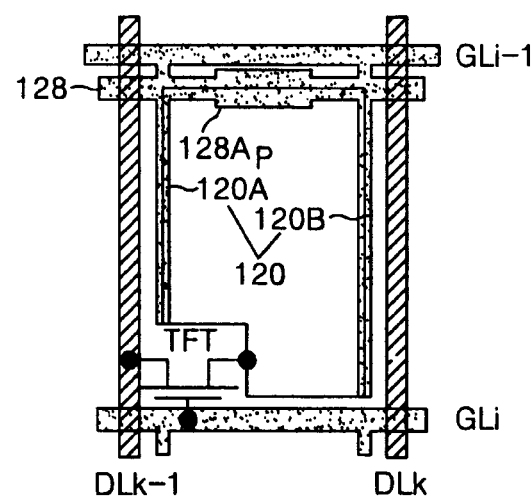
FIGS. 16A to 16G are plan views illustrating various types of the shield patterns and the common lines shown in FIG. 15.

In FIG. 16A, the shield pattern 120 includes first and second shield patterns 120A and 120B which are parallel to the data lines DLk−1 and DLk without overlapping and which overlap both side portions of the pixel electrode P. A common line 128, integral with the shield pattern 120, is parallel to the gate line GLi−1 of a previous stage without overlapping and overlaps an upper portion of the pixel electrode P. Moreover, the common line 128 includes an expanded part 128A whose line width is enlarged, to thereby enlarge an overlapping area of the pixel electrode P and the common line 128.

Figure 16B:
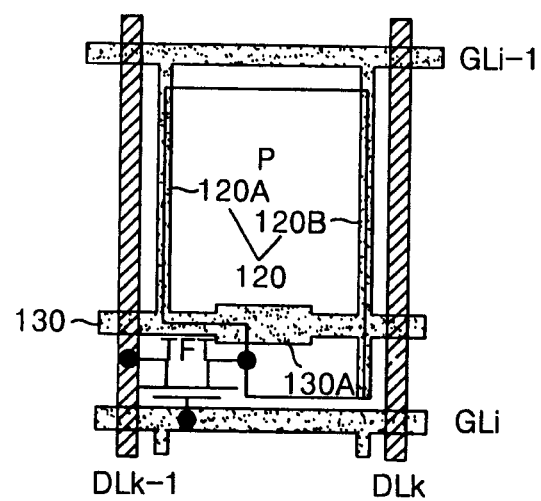

In FIG. 16B, the shield pattern 120 includes first and second shield patterns 120A and 120B which are parallel to the data lines DLk−1 and DLk without overlapping and which overlap both side portions of the pixel electrode P as shown in FIG. 16A. Moreover, the shield pattern 120 is connected to the gate line GLi−1 of a previous stage via the first and the second shield patterns 120A and 120B. A common line 130, being integral with the shield pattern 120, overlaps a lower portion of pixel electrode P that is adjacent and over a thin film transistor TFT. Moreover, the common line 130 includes an expanded part 130A whose line width is enlarged, to thereby enlarge an overlapping area of the pixel electrode P and the common line 130.

Figure 16C:
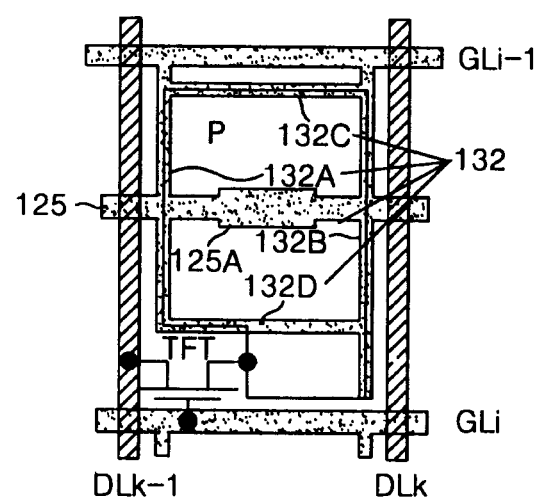

In FIG. 16C, a shield pattern 132 includes: first and second shield patterns 132A and 132B which are parallel to the data lines DLk−1 and DLk without overlapping and which overlap both side portions of the pixel electrode P; a third shield pattern 132C which overlaps an upper portion of the pixel electrode P parallel to the gate line GLi−1 of a previous stage without overlapping; and a fourth shield pattern 132D which overlaps a lower portion of the pixel electrode P adjacent and over TFT. Moreover, the shield pattern 132 is connected to the gate line GLi−1 of the previous stage via the first and the second shield patterns 132A and 132B. A common line 125, which is integral with the shield pattern 132, crosses a center portion of the pixel electrode P and is overlapped with the pixel electrode P. Moreover, the common line 125 includes an expanded part 125A whose line width is enlarged, to thereby enlarge an overlapping area of the pixel electrode P and the common line 125.

Figure 16D:
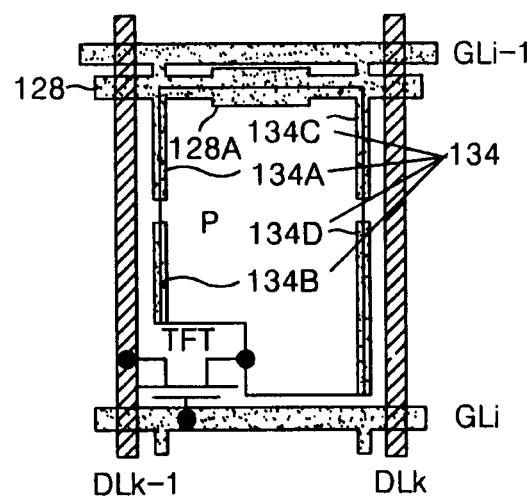

In FIG. 16D, a shield pattern 134 includes first to fourth shield patterns 134A, 134B, 134C and 134D which are parallel to the data lines DLk−1 and DLk without overlapping, and which overlap both side portions of the pixel electrode P and are separated from each other. The common line 128 connected to the first and the third shield patterns 134A and 134C among the shield patterns 134 overlaps an upper portion of pixel electrode P parallel with the gate line GLi−1 of a previous stage without overlapping and is also connected to the gate line GLi−1 of the previous stage. Moreover, the common line 128 includes an expanded part 128A whose line width is enlarged, to thereby enlarge an overlapping area of the pixel electrode P and the common line 128.

Figure 16E:
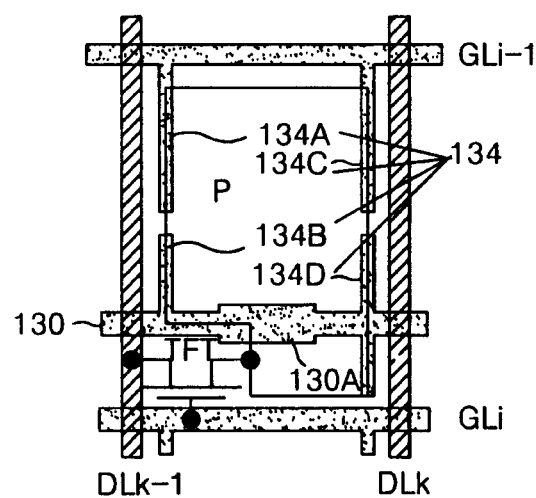

In FIG. 16E, a shield pattern 134 includes first to fourth shield patterns 134A, 134B, 134C and 134D which are parallel to the data lines DLk−1 and DLk without overlapping, which overlap both side portions of the pixel electrode P and are separated from each other, as shown in FIG. 16E. The first and the third shield patterns 134A and 134C among the shield patterns 134 are connected to the gate line GLi−1 of a previous stage. The common line 130, connected to the second and the fourth shield patterns 134B and 134D among the shield patterns 134, overlaps a lower portion of pixel electrode P adjacent and over the TFT. In this case, a gate signal is supplied to the first and the second shield patterns 134A and 134B via the gate line GLi 1 of the previous stage. Also, a bias voltage such as a low gate voltage, a common voltage Vcom and a ground voltage is supplied to the third and the fourth shield pattern 134C and 134D via the common line 130 or the bias voltage is not supplied separately. Moreover, the common line 130 includes an expanded part 130A whose line width is enlarged, to thereby enlarge an overlapping area of the pixel electrode P and the common line 130.

Figure 16F:
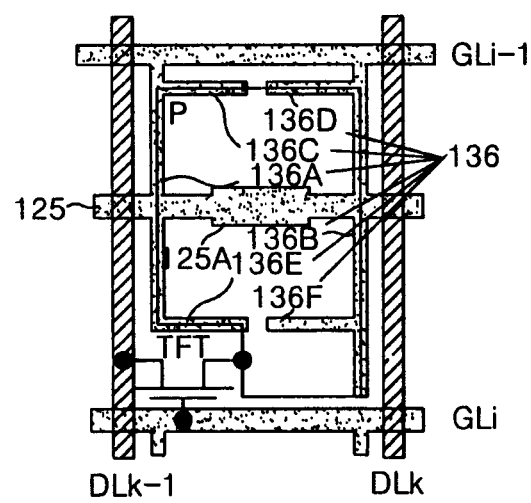

In FIG. 16F, a shield pattern 136 includes: first and second shield patterns 136A and 136B which are parallel to the data lines DLk−1 and DLk without overlapping and which overlap both side portions of the pixel electrode P; third and fourth shield patterns 136C and 136D overlap an upper portion of the pixel electrode P parallel with the gate line GLi−1 of a previous stage without overlapping and are separated from each other; and fifth and sixth shield patterns 136E and 136F overlap a lower portion of the pixel electrode P adjacent and over the TFT and are separated from each other. Moreover, the shield pattern 136 is connected to the gate line GLi−1 of previous stage via the first and the second shield patterns 136A and 136B. The common line 125, which is integral with the shield pattern 136, crosses the center portion of the pixel electrode P and overlaps the pixel electrode P. Moreover, the common line 125 includes an expanded part 125A whose line width is enlarged, to thereby enlarge an overlapping area of the pixel electrode P and the common line 125.

Figure 16G:
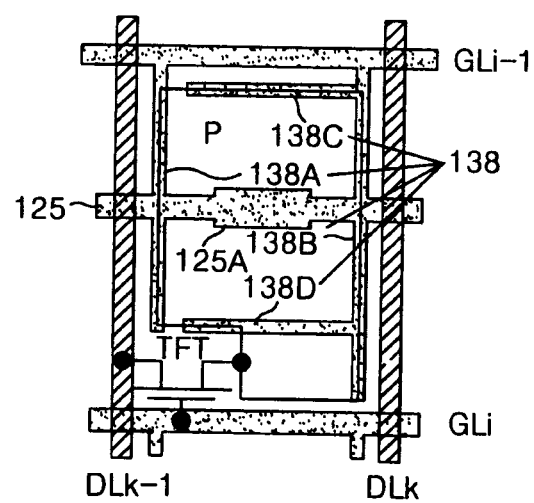

In FIG. 16G, a shield pattern 138 includes: first and second shield patterns 138A and 138B which are parallel to the data lines DLk−1 and DLk without overlapping and which overlap both side portions of the pixel electrode P; a third shield pattern 138C overlaps an upper portion of the pixel electrode P parallel to the gate line GLi−1 of a previous stage without overlapping. The third shield pattern is separated from the first shield pattern 138A and integral with the second shield pattern 138B; and a fourth shield pattern 138D overlaps a lower portion of the pixel electrode P adjacent and over the TFT and is separated from the first shield pattern 138A. The fourth shield pattern is integral with the second shield pattern 138B. Moreover, the shield pattern 138 is connected to the gate line GLi−1 of previous stage via the first and the second shield patterns 138A and 138B. The common line 125, which is integral with the shield pattern 138, crosses the center portion of the pixel electrode P and overlaps the pixel electrode P. Moreover, the common line 125 includes an expanded part 125A whose line width is enlarged, to thereby enlarge an overlapping area of the pixel electrode P and the common line 125.

As described above, a liquid crystal display panel according to the present invention includes a shield pattern connected to a common line, to thereby reduce a capacitance of a parasitic capacitor Cdp between the data line and adjacent pixel electrodes.

Moreover, the liquid crystal display panel according to the present invention connects the shield pattern, which is integral with the common line, to the gate line of a previous stage, to thereby reduce the capacitance of the parasitic capacitor Cdp between the data line and the pixel electrodes.

Therefore, according to the liquid crystal display panel of the present invention, as the capacitance of the parasitic capacitor Cdp is reduced, a distortion of pixel signal, supplied to the data line and the pixel electrode, caused by the coupling effect of the parasitic capacitor Cdp can be reduced.

Further, in accordance with the liquid crystal display panel of the present invention, as a capacitance of the parasitic capacitor Cdp is reduced, a capacitance deviation of the parasitic capacitor Cdp between the data line DL and left side and right side pixel electrode P can be reduced. As a result, the liquid crystal display panel according to the present invention reduces vertical crosstalk caused by the capacitance deviation of the parasitic capacitor Cdp and an asymmetric light leakage, to thereby improve display quality.

In the event that the liquid crystal display panel according to the present invention supplies a common voltage Vcom to the shield pattern via the common line. In the liquid crystal display panel, a direct current voltage is prevented from being supplied between the shield pattern and an upper common electrode, to thereby prevent a deterioration of the liquid crystal. Accordingly, the liquid crystal display panel according to the present invention is capable of preventing crosstalk and light leakage caused by the deterioration of the liquid crystal.

It will be apparent to those skilled in the art that various modifications and variations can be made in the present invention. Thus, it is intended that the present invention cover the modifications and variations of the invention provided they come within the scope of the appended claims and their equivalents.

What is claimed is:

1. A liquid crystal display panel, comprising:
    thin film transistors each located at a crossing of a gate line and a data line,
    liquid crystal cells each including a pixel electrode connected to each of the thin film transistors;
    First and third shield patterns in the liquid crystal cells, each of the first and third shield patterns being parallel to the data line without overlapping the data line, wherein the first and third shield patterns are insulated from and overlap an outer portion of the pixel electrode;
    a common line arranged to connect the shield patterns for each of the liquid crystal cells;
    a first horizontal line consisting of the liquid crystal cells connected to the data lines adjacent to their left side, wherein each of the thin film transistors is connected to a data line adjacent to its left side,
    a second horizontal line consisting of the liquid crystal cells connected to the data lines adjacent to their right side, wherein each of the thin film transistors is connected to a data line adjacent to its right side,
    wherein the common line crosses the pixel electrode.

2. The liquid crystal display panel according claim 1, further comprising second and fourth shield patterns shield patterns arranged separately from each of the first and third shield patterns, wherein the first and third shield patterns are connected to the common line at the outer portion of the pixel electrode.

3. The liquid crystal display panel according claim 1, further comprising second and fourth shield patterns that are separated from each of the first and third shield patterns, wherein the first and third shield patterns are connected to the common line at the outer portion of the pixel electrode and connected to gate line a previous stage.

4. The liquid crystal display panel according to claim 3, wherein a bias voltage is supplied to the first and third shield patterns via the common line.

5. The liquid crystal display panel according to claim 4, wherein the bias voltage is one of a ground voltage, a common voltage referenced to drive the liquid crystal cells and a low gate voltage for an off-state of the thin film transistor.

6. The liquid crystal display panel according to claim 5, wherein the common line further includes an expanded part whose line width is enlarged at a portion of the overlapping part of the common line and the pixel electrode.

7. The liquid crystal display panel according to claim 1, further comprising a storage capacitor arranged at an overlapping part of the first and third shield patterns and the pixel electrode and at an overlapping part of the common line and the pixel electrode.

8. The liquid crystal display panel according to claim 1, wherein the first and third shield patterns and the common line are made of a metal identical to the gate line.

9. The liquid crystal display panel according to claim 1, wherein the first and third shield patterns and the common line include a first metal pattern made of a metal identical to the gate line, a second metal pattern made of a metal identical to the data line and a connection part to connect the first and second metal patterns.

10. The liquid crystal display panel according to claim 1, wherein the first horizontal line and the second horizontal line are alternately arranged for at least one horizontal line.

* * * * *